United States Patent
McAndrew

(10) Patent No.: US 6,173,938 B1
(45) Date of Patent: Jan. 16, 2001

(54) TWO SPEED AIR CYLINDER FOR SLIT VALVE MOTION CONTROL

(75) Inventor: Robert McAndrew, Austin, TX (US)

(73) Assignee: Applied Materials, Inc., Santa Clara, CA (US)

(*) Notice: Under 35 U.S.C. 154(b), the term of this patent shall be extended for 0 days.

(21) Appl. No.: 09/158,597

(22) Filed: Sep. 22, 1998

(51) Int. Cl.[7] ........................................ F16K 31/12
(52) U.S. Cl. .............................. 251/31; 251/35; 251/48; 91/408
(58) Field of Search ........................ 251/31, 35, 48; 91/408; 137/1

(56) References Cited

U.S. PATENT DOCUMENTS

| | | | |
|---|---|---|---|
| 3,247,767 | * 4/1966 | Aslan | 91/26 |
| 3,963,045 | 6/1976 | Damitz | 137/505.13 |
| 4,373,427 | 2/1983 | Garlapaty et al. | 92/88 |
| 5,226,632 | 7/1993 | Tepman et al. | 251/335.3 |
| 5,363,872 | * 11/1994 | Lorimer | 137/1 |
| 5,692,429 | 12/1997 | Sonntag | 91/395 |

* cited by examiner

Primary Examiner—Henry J. Recla
Assistant Examiner—Timothy L. Maust
(74) Attorney, Agent, or Firm—Thomason, Moser & Patterson

(57) ABSTRACT

A multi-speed slit valve apparatus and method of actuating a slit valve apparatus at least at two distinct speeds is provided. The slit valve apparatus includes a pneumatic cylinder 210 having a primary channel 254, 266 and auxiliary channel 258, 270 at each end, wherein the auxiliary channels 258, 270 have a cross sectional area smaller than that of the primary channels 254, 266. A piston 226 defining a front volume 240 and a back volume 242 is disposed in the cylinder 210 and is reciprocally actuated by a compressed fluid such as air. At a predetermined stage during the cylinder's out-stroke and in-stroke the primary channels 254, 266 become sealed from the front and back volumes 240, 242, respectively, such that during the remainder of the stroke the fluid is biased to exhaust through the auxiliary channels 258, 270.

14 Claims, 8 Drawing Sheets

TWO SPEED AIR CYLINDER FOR SLIT VALVE MOTION CONTROL

FIELD OF THE INVENTION

The present invention generally relates to valves commonly used in the fabrication of integrated circuits and flat panel displays. Specifically, the present invention relates to placement and use of pneumatic cylinders in a vacuum processing system to operate a slit valve door.

BACKGROUND OF THE INVENTION

Vacuum processing systems for processing 100 mm, 200 mm, 300 mm or other diameter wafers are generally known. Examples include the CENTURA® and ENDURA® platforms available from Applied Materials, Inc. in Santa Clara, Calif. An example of a typical vacuum processing system 100 is shown in FIG. 1. The system 100 typically has a centralized transfer chamber 102 (shown in detail in FIG. 2) mounted on a monolith platform (not shown). The transfer chamber 102 is the center of activity for the movement of wafers being processed in the system. One or more process chambers 104 and one or more load locks 108 attach to the transfer chamber 102 at its various facets 106, 112. Elongated apertures commonly known as slit valve apertures 14 (shown in FIG. 2) provide a transfer plane between the process chambers 104 and the load lock chambers 108 through which the wafers are passed. The wafers are transferred by a robot 120 disposed in the transfer chamber 102. The apertures 14 are selectively opened and closed to isolate the process chambers 104 from the transfer chamber 102 while wafers are being processed in the process chambers 104. The process chambers 104 are either supported by the transfer chamber 102 and its platform or by their own platform.

Referring briefly to FIG. 2, a perspective view is shown of the transfer chamber 102 with the lid and the robot 120 removed so that the interior of the transfer chamber 102 is visible. A centrally located orifice 66 formed in a floor 62 provides a means for mounting the robot 120 therein. Openings 38 formed in the floor 62 are adapted to receive slit valve apparatuses (discussed in detail below) therethrough. As discussed above, the slit valve apertures 14 formed in the facets 106 provide a transfer plane between the transfer chamber 102 and the process chambers 104 (shown in FIG. 1).

While the transfer chamber 102 is typically held at a constant vacuum, the process chambers 104 may be pumped to a greater vacuum or backfilled with gases to increase the pressure therein in preparation for performing their respective processes. The process chambers 104 may perform various processes such as rapid thermal processing, physical vapor deposition, chemical vapor deposition, etching, etc. After processing, the relative pressures of the process chambers 104 and the transfer chamber 102 are equalized before opening the valve to permit fluid communication between the chambers.

Referring again to FIG. 1, a mini-environment, or wafer handling chamber 114, which attaches to the load lock chambers 108 is shown. A wafer aligner 119 is disposed within the mini-environment 114 so that it is substantially in or near the pathway of a wafer being moved from a pod loader 115–118 to a load lock chamber 108. The wafer aligner 119 centers the wafers and orients the direction of the wafers according to the requirements of a process that the wafers are to undergo in the process chambers 104. An example of a wafer aligner 119 is the PRE 200 Series Wafer Pre-Aligner available from Equipe Technologies of Sunnyvale, Calif. One or more robots 124, 125 are disposed within the mini-environment 114 for transferring the wafers between pod loaders 115–118, the wafer aligner 119, and the load lock chambers 108. An example of this type of robot 124, 125 is the ATM-105 available from Equipe Technologies of Sunnyvale, Calif.

As mentioned above, access between the load locks 108, the transfer chamber 102, and the process chambers 104 is provided through slit valve apertures 14 which are selectively sealed by a slit valve apparatus. FIG. 3 shows a typical slit valve apparatus 32 disposed in the transfer chamber 102. The slit valve apparatus 32 is shown disposed through the opening 38 and mounted to the transfer chamber floor 62 by a mounting bracket 52. The slit valve apparatus 32 generally includes a piston rod 36 having a first end disposed through a pneumatic cylinder 40 and a second end coupled to a door 28 by an adjustment mechanism 56. In order to maintain the extreme vacuum within the various environments of the system 100 (shown in FIG. 1), the slit valve door 28, having an O-ring 34 disposed thereon, must be hermetically sealed over the aperture 14. A seat 22 includes a seating surface 24 defining a sealing plane 26 which is angularly disposed with respect to the transfer plane 20 and perpendicular to the axis of actuation 54. In the closed position, the door 28 abuts the seating surface 24.

The slit valve apparatus 32 is activated by the injection of compressed air into an inlet/exhaust port 50 of the pneumatic cylinder 40. A constant psi of compressed air is supplied to the pneumatic cylinder 40 so that a terminal stroke velocity is reached prior to the sealing of the slit valve aperture 14. At the end of its stroke, the slit valve door 28 impacts the aperture 14 and halts the slit valve apparatus' stroke. Thus, the speed of the door 28 relative to the aperture 14 is abruptly terminated and the processing system 100 (shown in FIG. 1) as a whole absorbs the door's kinetic energy.

In an effort to increase throughput, the wafers being processed have become increasingly larger. The trend today is to use 300 mm wafers to form multiple devices thereon. Larger wafers, of course, require larger processing systems which include larger slit valve doors and apertures. Larger doors, in turn, require larger components such as the pneumatic cylinder, mounting bracket and adjustment mechanism. It has been discovered in the scale-up process for 300 mm substrates that increasing the slit valve components creates additional concerns. Since the door's kinetic energy and momentum is a function of it velocity and mass, an increase in mass results in increased kinetic energy and momentum for a given velocity. In general, total system vibration effects reach a critical level creating pervasive adverse conditions. For example, particle generation, metal to metal contact, hermetic sealing, door alignment, and pneumatic cylinder and door damage are significantly more problematic. Further, with larger slit valve doors the vibration is not localized to the immediate chamber area surrounding a particular slit valve. Rather, the force of impact affects remote parts of the chamber, thereby damaging delicate instrumentation and interfering with ongoing processes in other chambers. These undesirable conditions are caused primarily by the sealing impact of more massive slit valves.

There remains a need, therefore, for a slit valve apparatus and method which minimizes the total vacuum system trauma caused by impact of the slit valve door upon closing, thereby reducing the generation of particle debris, vibration, and damage to the vacuum system's components, including the pneumatic air cylinder.

SUMMARY OF THE INVENTION

The invention generally provides a multi-stage, slit valve door assembly which reduces semiconductor processing system trauma caused by the extension, sealing, and retraction of the slit valve door. In one aspect of the invention, the apparatus comprises a multi-speed, pneumatic cylinder preferably including a cylinder body and a bore therein enclosed by end caps. A longitudinally reciprocating piston is disposed within the bore to define a front and back volume. Primary inlet/exhaust ports and auxiliary inlet/exhaust ports are located at both ends of the cylinder with channels connected thereto for providing fluid communication between the bore and the cylinder's external environment. A compressed gas source, supplying a gas such as air, is connected at both ends to the primary inlet/exhaust ports. Sealing elements are disposed on either side of the piston such that the sealing elements will seal the primary inlet/exhaust ports from communication with the front and back volumes during the latter phase of the piston's out-stoke and in-stroke, respectively. The remaining fluid, therefore, is biased to escape through the respective auxiliary inlet/exhaust port thereby cushioning the latter phase of the stroke. Thus, the piston is linearly actuated at the initiation of the out-stroke by forcing the compressed gas into the inlet/exhaust port at the back end of the cylinder. During mid-stroke, the cylinder reaches a terminal speed. At a predetermined stage during the stroke, the sealing elements restrict the front end inlet/exhaust ports from the front volume and the cylinder slows to a slower speed. The in-stroke is similarly cushioned.

In another aspect of the invention, a processing system is provided with the multi-speed actuator connected to the slit valve doors. The system includes a plurality of process chambers and load locks attached to the periphery of a transfer chamber. Substrates are shuttled from the load locks to the processing chamber by a robot centrally located within the transfer chamber. Slit valve apertures provide access between the load locks and transfer chamber and between the transfer chamber and the process chambers. The slit valve apertures are selectively sealed and unsealed by the doors during operation to allow the transfer of substrates.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

Figure 4:
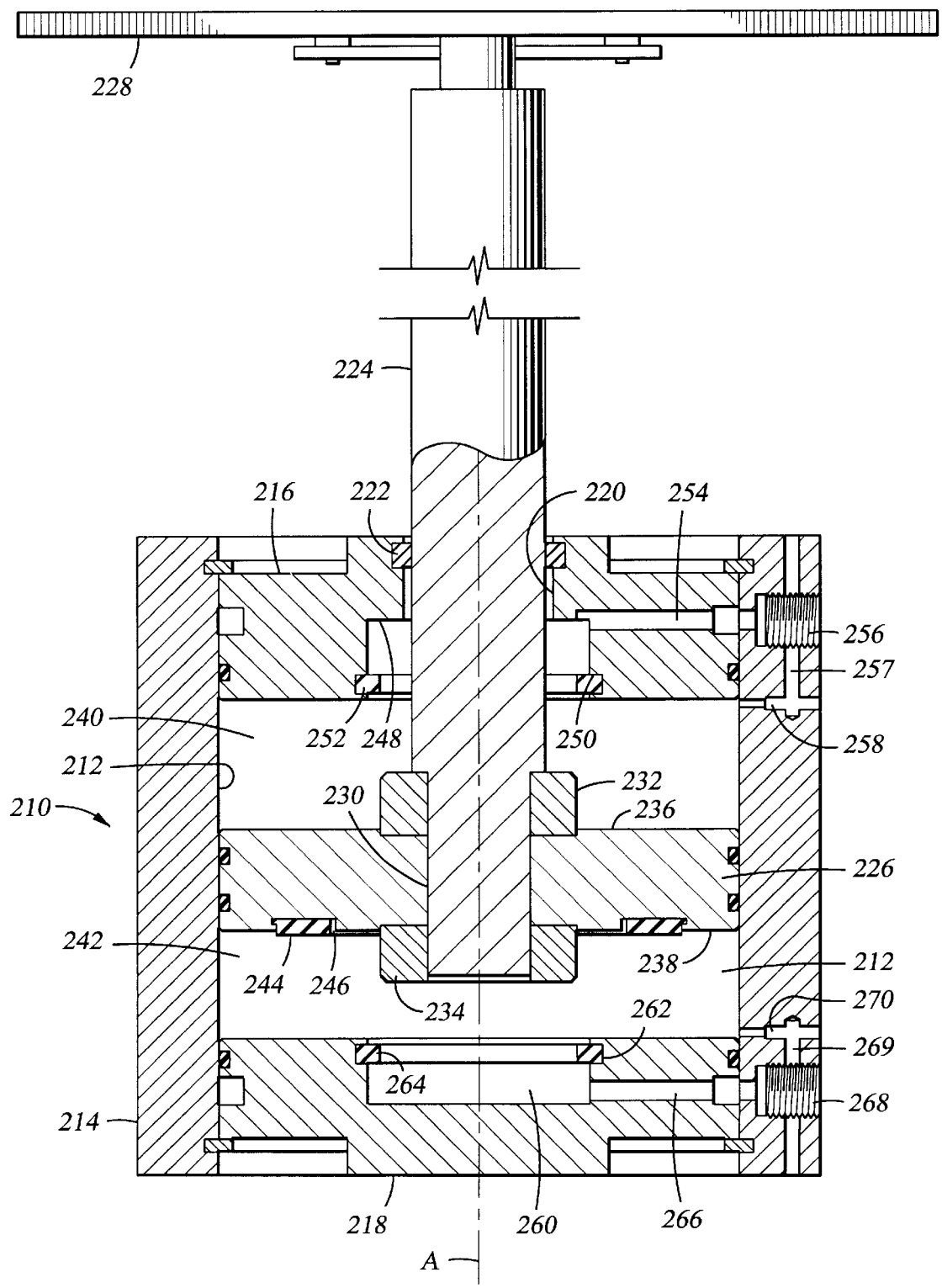
FIG. 4 is a cross sectional view of the slit valve apparatus in mid-stroke.

FIG. 4 is a cross sectional drawing of a pneumatic cylinder 210 in mid-stroke. The pneumatic cylinder 210 generally comprises a cylinder bore 212 defined by cylindrical body 214 with a front end cap 216 and a back end cap 218. The pneumatic cylinder 210 is perpendicularly intersected at its center by an axis A. A front end cap bore 220, with a sealing element 222 disposed therein, is formed in the front end cap 216 about the axis A. A slidable piston rod 224, with a piston 226 connected to its back end, is disposed within the cylinder body 214 lengthwise along the axis A. The piston rod 224 extends through the front end cap bore 220 and is coupled at its front end to a slit valve door 228. The back end of the piston rod 224 is of a smaller diameter and extends through a piston bore 230 formed in the piston 226 about the axis A. A forward beveled front annular sealing element 232 and a back annular sealing element 234 (also known as "spears" in the industry) are located on the front piston face 236 and the back piston face 238, respectively. A front volume 240 is defined by the cylinder body 214, the front end cap 216, and the front piston face 236, while a back volume 242 is defined by the cylinder body 214, the back end cap 218, and a back piston face 238. A bumper 244 is disposed in an annular groove 246 formed in the back piston face 238 and protrudes beyond the back piston face 238 a distance sufficient to prevent contact between the back piston face 238 and the back end cap 218.

The inner side of the front end cap bore 220 is diametrically enlarged so as to define a front recess 248 intersected by the piston rod 224. A front lip seal 252 is provided in the front end cap 216 protruding into the inner end of the front recess 248. The front recess 248 is in fluid communication with the front volume 240 and a front primary fluid channel 254 which is disposed within the front end cap 216. The front primary fluid channel 254 extends radially outward through the inner surface of the cylinder body 214 and is in fluid communication with a front primary inlet/exhaust port 256 providing communication between the front recess 248 and the cylinder's exterior environment. A compressed fluid source 280 (shown only in FIG. 4 for simplicity) is connected to the front primary inlet/exhaust port 256 to selectively supply a fluid to the front piston face 236. The fluid provided by the compressed fluid source may be a gas or a liquid. Most preferably a gas such as air is used. A front auxiliary channel 258 disposed radially through the cylinder body 214 provides fluid communication between the front volume 240 and the cylinder's exterior environment. A front bridging conduit 257 connects the front primary inlet/exhaust port 256 and the front auxiliary channel 258.

A back recess 260 is shown formed in the inner side of the back end cap 218. A back lip seal 264 is provided in the back end cap 218 and protrudes slightly into the inner end of the back recess 260. The back recess 260 is in fluid communication with the back volume 242 and a back primary fluid channel 266 which is radially disposed within the back end cap 218. The back primary fluid channel 266 extends radially outward through the inner surface of the cylinder body 214 and is in fluid communication with a back primary inlet/exhaust port 268 providing communication between the back recess 260 and the cylinder's exterior environment. The compressed fluid source 280 is connected to the back primary inlet/exhaust port 268 to selectively supply a fluid to the back piston face 238. A back auxiliary channel 270 disposed radially through the cylinder body 214 provides fluid communication between the back volume 242 and the cylinder's exterior environment. A back bridging conduit 269 connects the back primary inlet/exhaust port 268 and the back auxiliary channel 270.

Figure 5:
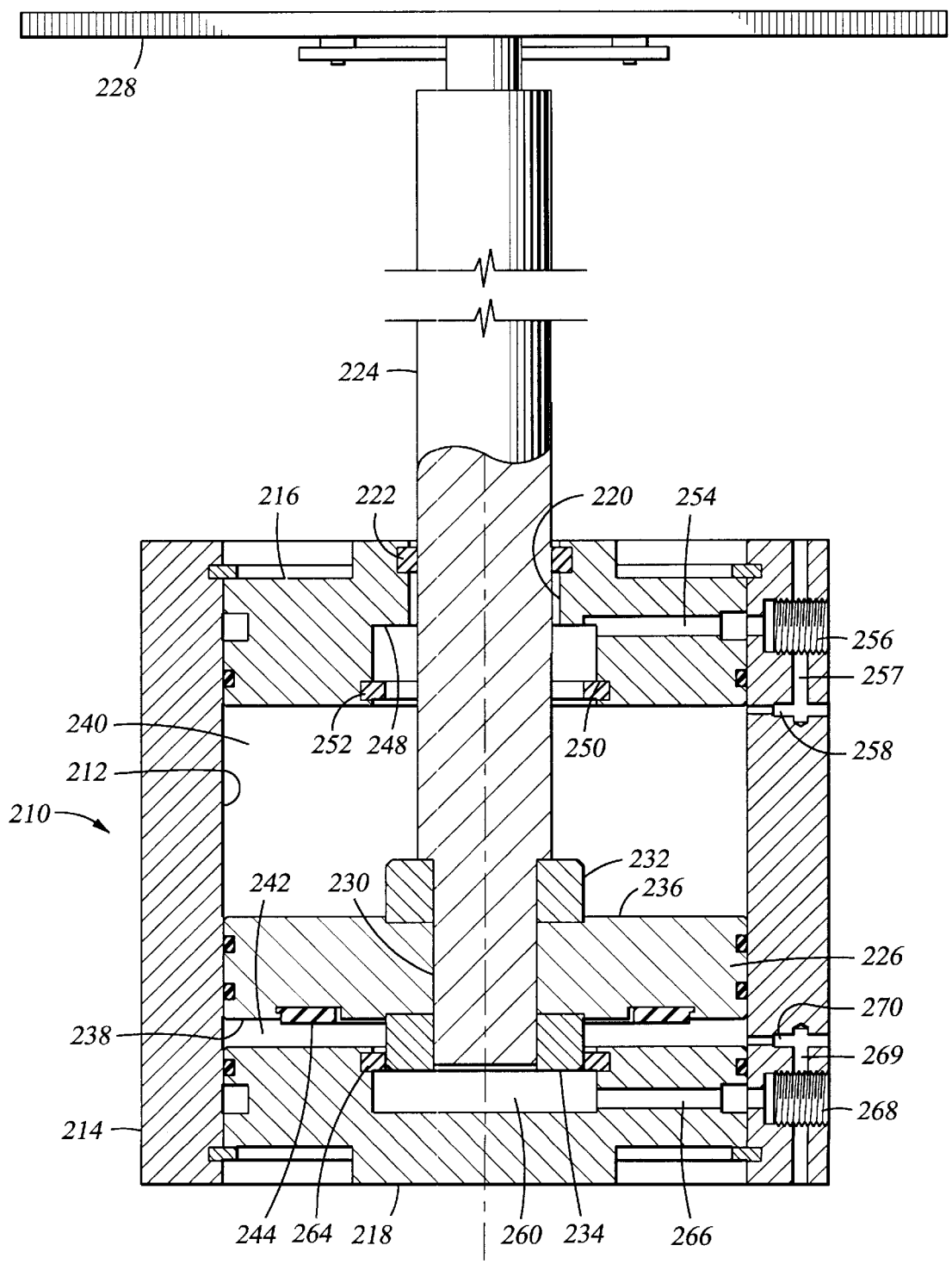
FIG. 5 is a cross sectional view of the slit valve apparatus at the cushioned phase of its in-stoke stroke.

FIG. 5 shows the pneumatic cylinder 210 at the cushioned phase of the in-stroke. As the back annular sealing element 234 sealingly engages the back lip seal 264, the back recess 260 and consequently, the back primary channel 266, become substantially sealed from the back volume 242 thereby biasing the remaining fluid in the back volume 242 to vent through the back auxiliary channel 270. Thus, the piston 226 and piston rod 224 slow from a first speed to a second slower speed at a time substantially contemporaneously with the sealing of the back primary fluid channel 266 from the back volume 242. The duration and speed of the cushioned phase of the in-stroke for a particular fluid is generally determined by the length of the back annular sealing element 234, the cross sectional area of the back auxiliary fluid channel 270, the back volume 242, the volume of the back recess 260, and the force applied to the piston 226 by the compressed fluid. Therefore, variations of the duration and speed can be made by adjusting these components and conditions. During the piston's 226 continued retraction in the cushioned phase, the bumper 244 engages the inner side of the back end cap 218 in mating abutment to prevent contact with the back piston face 238 and the back annular sealing element 234. The in-stroke is terminated substantially contemporaneously with the engagement of the bumper 224 to the back end cap 218. The cushioned stroke and the bumper 224 mitigate the adverse effects of vibrational energy caused by an abrupt stroke cessation. In particular, undesirable effects such as particle generation and total system damage are avoided. Consequently, wafer quality as well as the reliability and longevity of the slit valve apparatus are improved.

Figure 6:
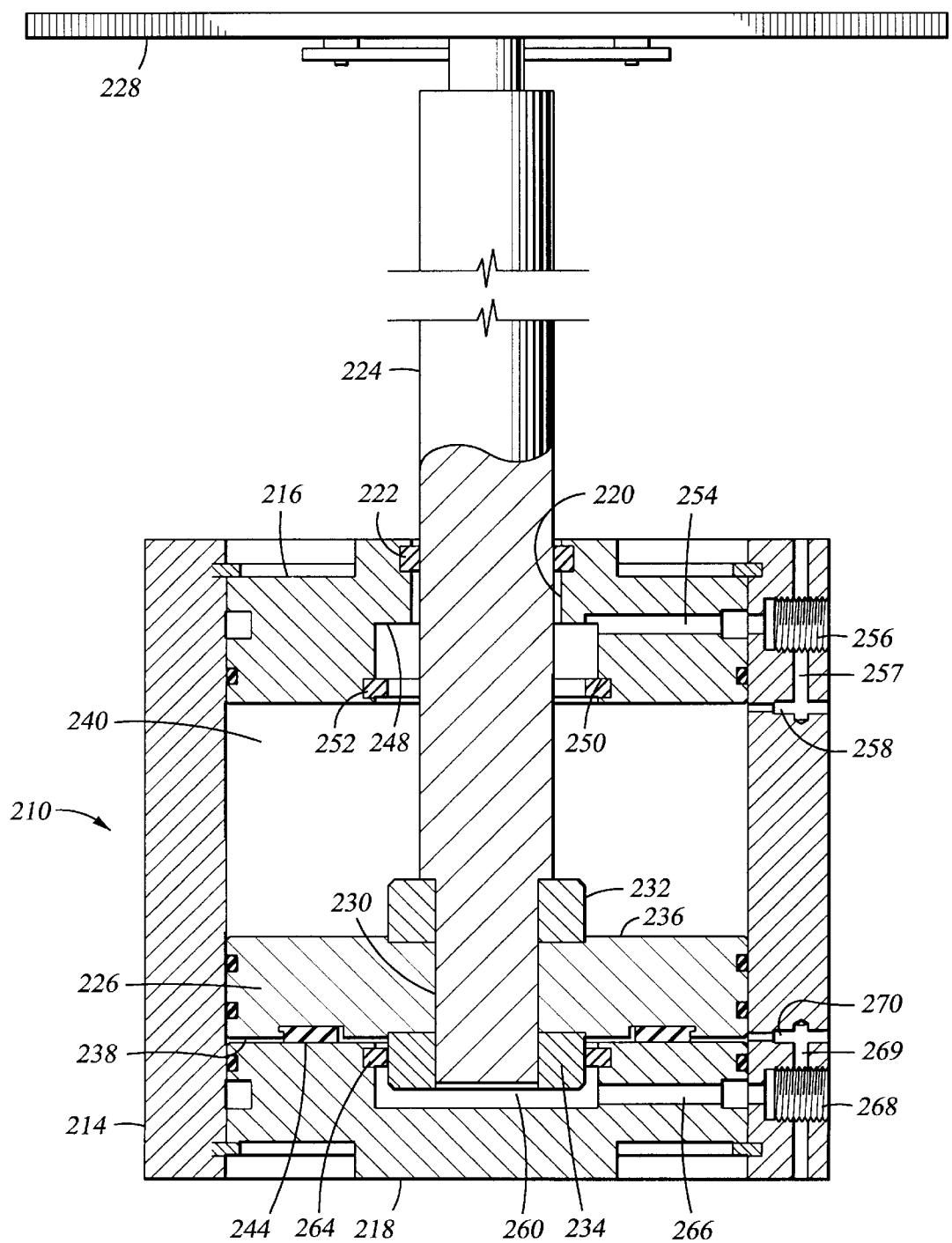
FIG. 6 is a cross sectional view of the slit valve apparatus in a fully retracted position.

FIG. 6 shows the pneumatic cylinder 210 in a fully retracted position. The bumper 244 rests in mating abutment with the back end cap 218. During initiation of the out-stroke compressed fluid is pumped into the back primary fluid channel 266 via the back primary inlet/exhaust port 268 both of which are in fluid communication with the back end of the back annular sealing element 234. As the piston travels toward the front end cap 216, the fluid in the front volume 240 is expelled through the front primary inlet/exhaust port 256 via front primary fluid channel 254 and the front auxiliary fluid channel 258. Initially, the piston 226 will sustain a resistive force which endures until the back end of the back annular sealing element 234 moves beyond the back lip seal 264. This effect is due to the fact that a partial vacuum is created in the interstitial space defined by the back piston face 238, the inner side of the back end cap 218, the back annular sealing element 234, and the cylinder body 214. The partial vacuum results because of the relative differences in the cross-sectional areas of the back primary fluid channel 266 and the back auxiliary fluid channel 270 which relieves the interstitial space. The back auxiliary fluid channel 270, having a smaller cross sectional diameter, allows for a slower rate of fluid intake and, consequently, a slower piston speed.

Figure 7:
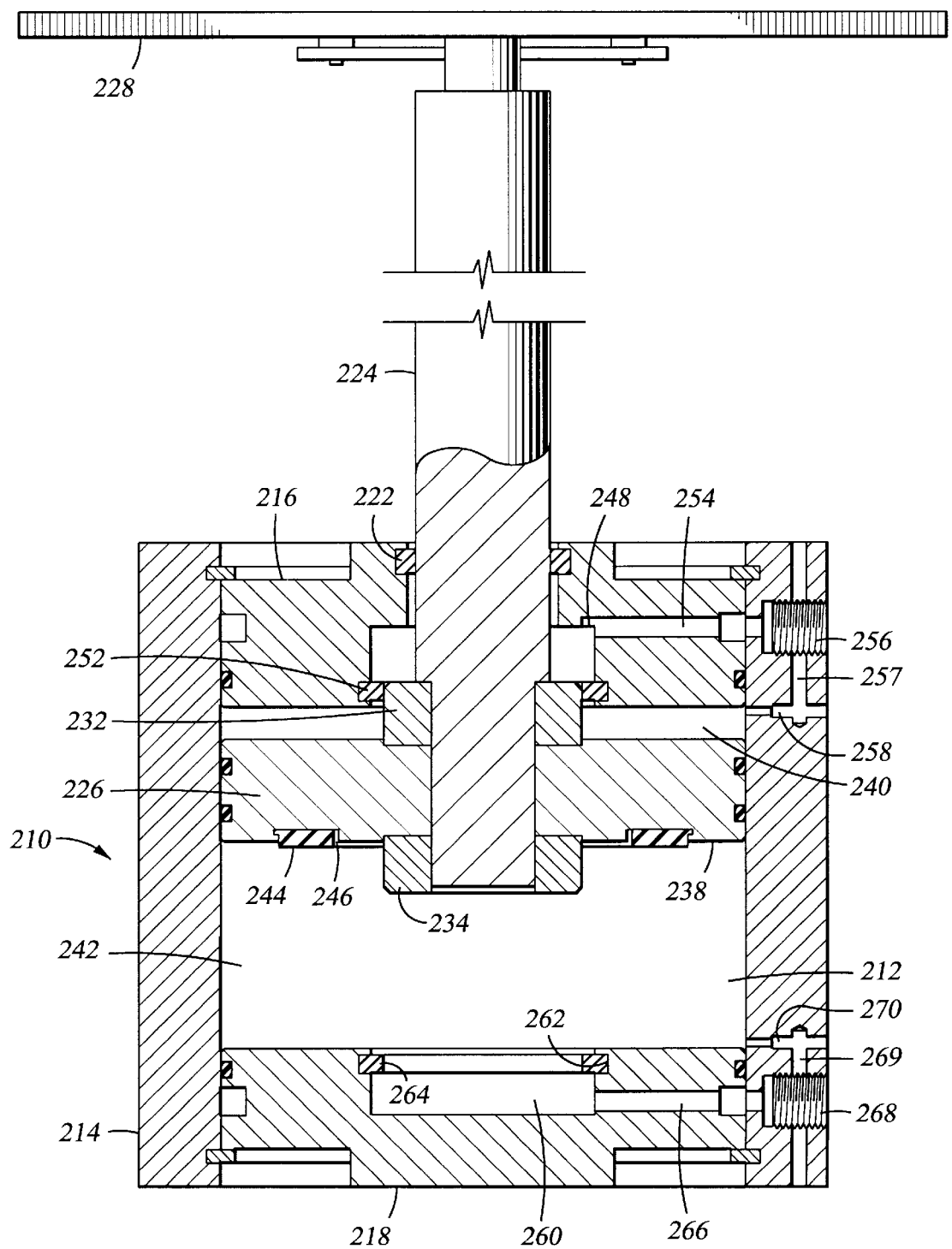
FIG. 7 is a cross sectional view of the slit valve apparatus at the cushioned phase of the out-stroke.

FIG. 7 shows the pneumatic cylinder 210 in the cushioned phase of the out-stroke. As the front annular sealing element 232 sealingly engages the front lip seal 252 the front recess 248 and the front primary fluid channel 254 become substantially sealed from the front volume thereby biasing the remaining air in the front volume 240 to vent through the front auxiliary fluid channel 258. Thus, the piston 226 and piston rod 224 slow from a first speed to a second slower speed at a time substantially contemporaneously with the sealing of the front primary fluid channel 254. The duration and speed of the cushioned phase of the in-stroke for a particular fluid is determined by the length of the front annular sealing element 232, the cross sectional area of the front auxiliary fluid channel 258, the front volume 240, the volume of the front recess 248, and the force applied to the piston 226 by the compressed fluid. Therefore, variations of the duration and speed can be made by adjusting these components and conditions. During the piston's continued extension in the cushioned phase, the slit valve door 228 sealingly engages a seating surface of an aperture (not shown). The out-stroke is terminated substantially contemporaneously with the engagement of the slit valve door 228 to the seating surface. A continuing pressure to the door 228 supplied by the compressed fluid source 280 (shown in FIG. 4) maintains a hermetic seal. Because of the slower door speed, the closing force is lessened, thereby avoiding undesirable effects such as particle generation in the processing chamber (not shown). Further, the reliability and longevity of the various components of the pneumatic cylinder 210 are enhanced resulting in less maintenance and downtime.

Figure 1:
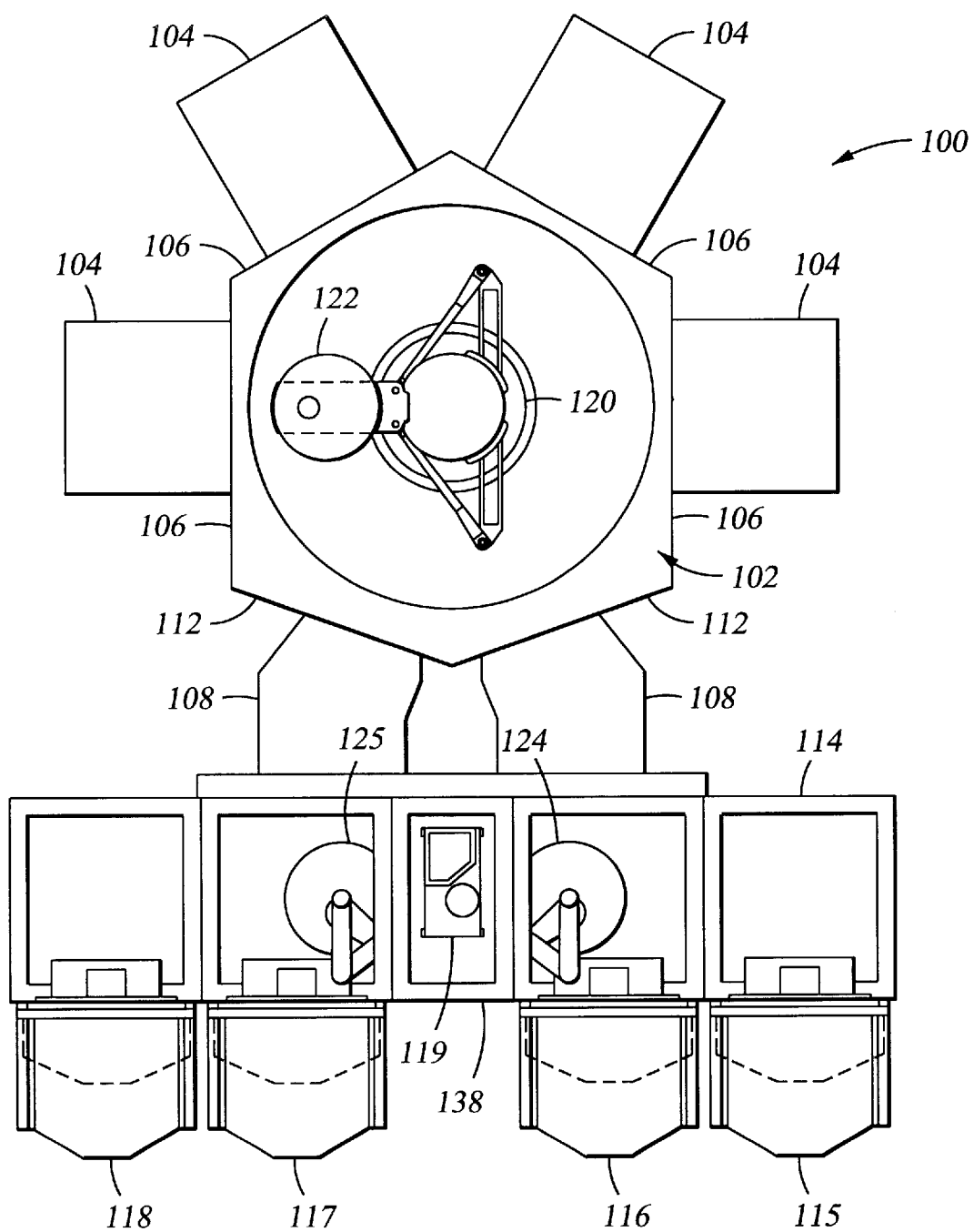
FIG. 1 is a top schematic of a first embodiment of a vacuum processing system incorporating the present invention.
Figure 2:
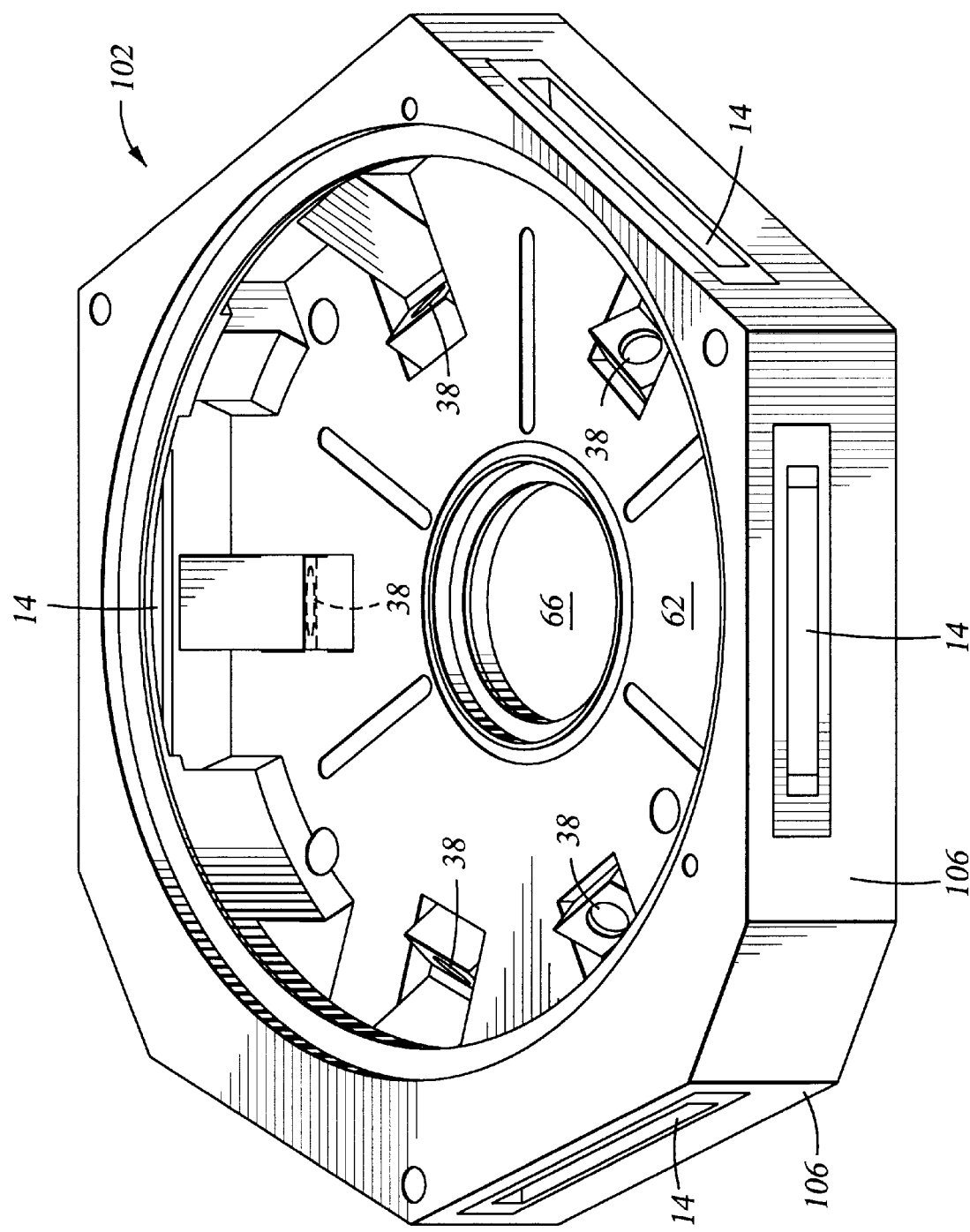
FIG. 2 is a perspective view of a transfer chamber with the lid removed.
Figure 3:
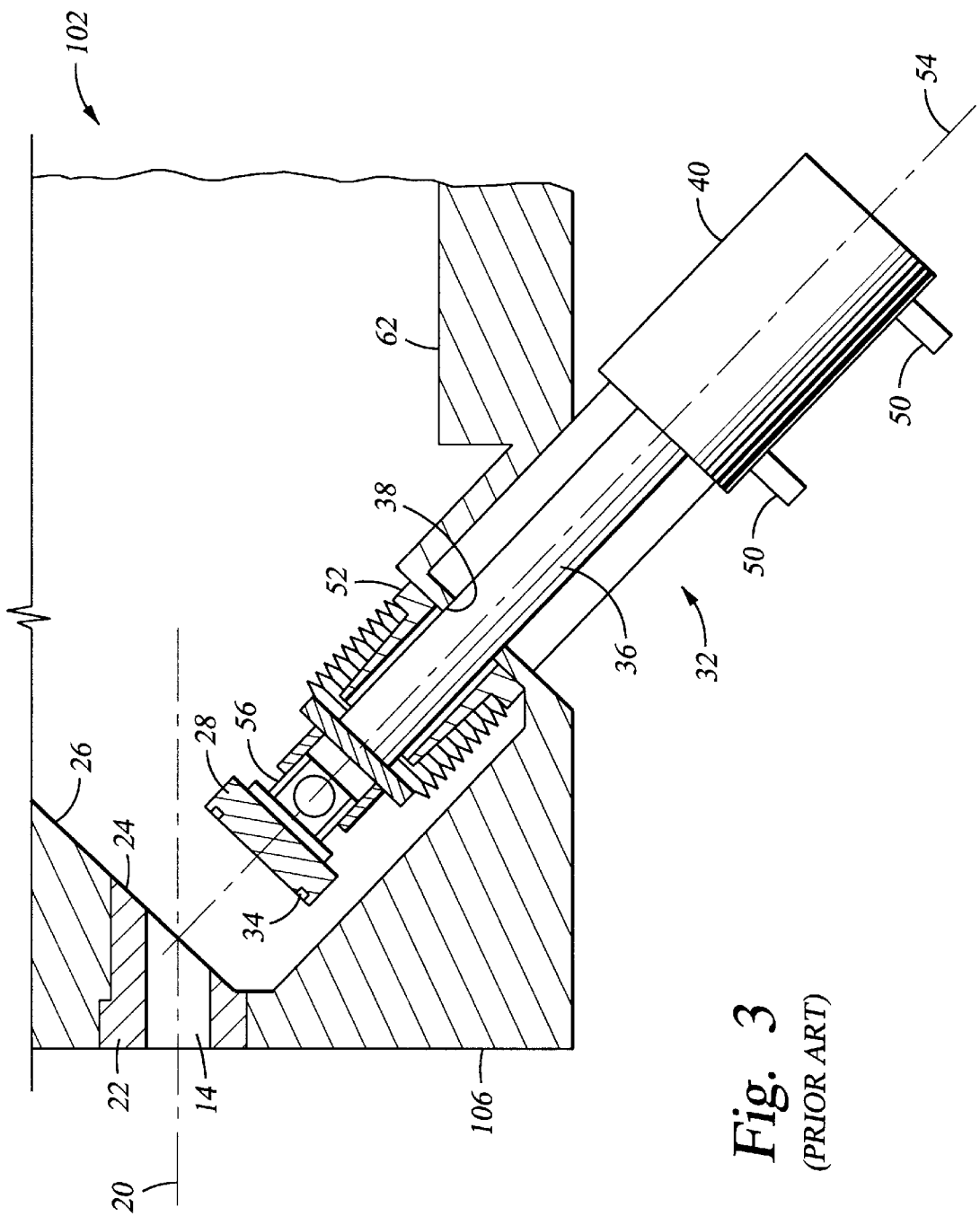
FIG. 3 is a partial cross-sectional elevational view of a slit valve apparatus in an open position.
Figure 8:
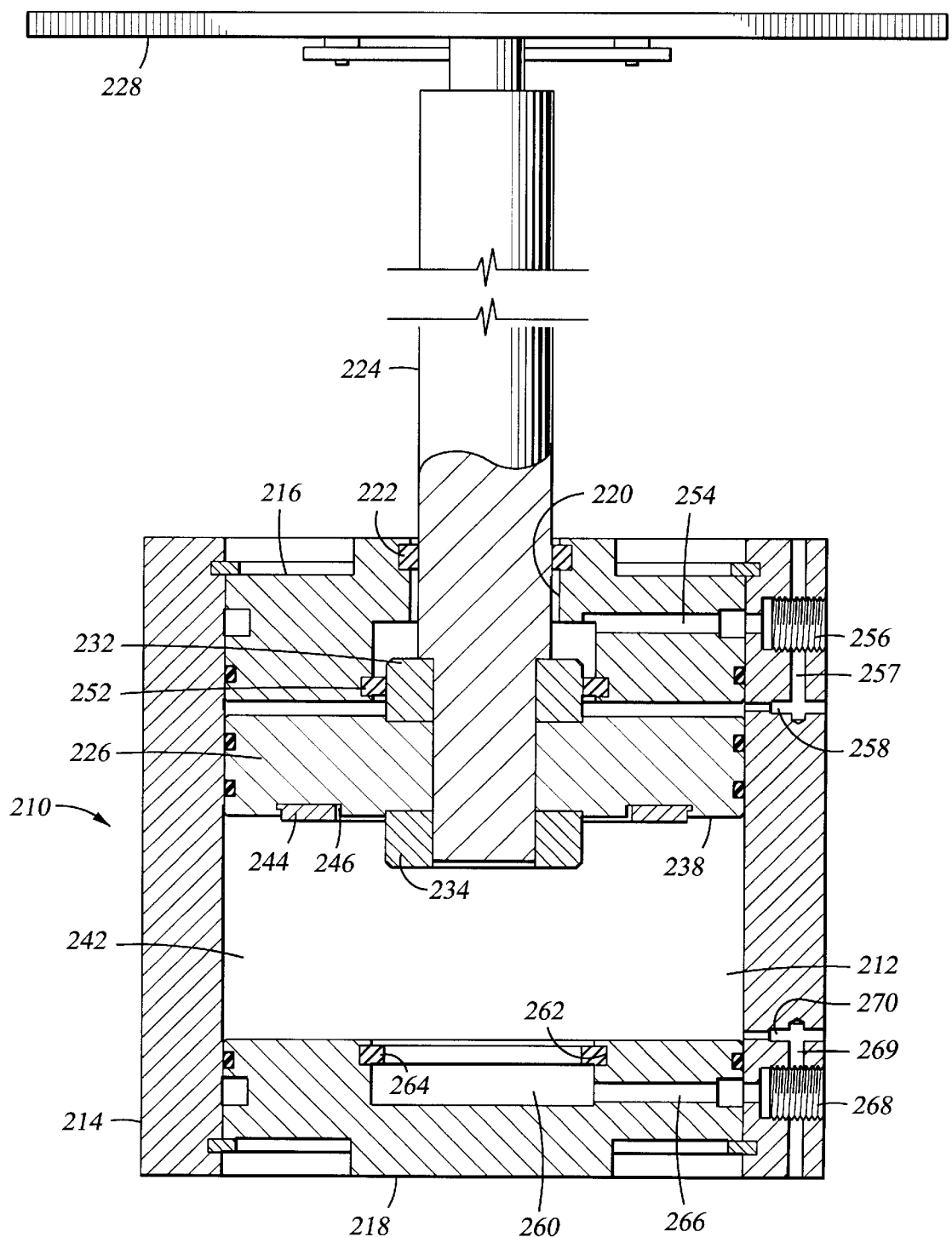
FIG. 8 is a cross sectional view of the slit valve apparatus in a fully extended position.

FIG. 8 shows the pneumatic cylinder 210 in its fully extended position. The pneumatic cylinder 210 is removed some distance from the aperture 14 (shown in FIG. 2) such that at full extension, the door 228 being in mating abutment with the chamber wall 12 (FIG. 2), the front piston face 236 and the inner side of the front end cap 216 are prevented from making contact. During initiation of the in-stroke compressed fluid is pumped into the front primary fluid channel 254 via the front primary inlet/exhaust port 256 both of which are in fluid communication with the front end of the front annular sealing element 232. As the piston 226 travels toward the back end cap 218, the fluid in the back volume 242 is expelled through the back primary inlet/exhaust port 268 via back primary fluid channel 266 and the back auxiliary fluid channel 270. Initially, the piston 226 will sustain a resistive force which endures until the front end of the front annular sealing element 232 moves beyond the front lip seal 252. This effect is due to the fact that a partial vacuum is created in the interstitial space defined by the front piston face 236, the inner side of the front end cap 216, the front annular sealing element 232, and the cylinder body 214. This partial vacuum results because of the relative differences in the cross-sectional areas of the front primary fluid channel 254 and the front auxiliary fluid channel 258 which relieves the interstitial space. The front auxiliary fluid channel 258, having a smaller cross sectional diameter, allows for a slower rate of fluid intake and, consequently, a slower piston speed.

An alternative embodiment may place a valve 282, such as a pressure relief valve or a solenoid valve, at the terminus of one or both of the auxiliary fluid channels 258, 270 as shown in FIG. 4. The valve 282 could selectively restrict fluid flow from the auxiliary fluid channels 258, 270 at predetermined relief pressures. For example, during the out-stroke a front relief valve placed in series with the front auxiliary fluid channel 258 would be forced open by the predetermined pressure of the fluid exhausting from the front volume 240. During at least a portion of the in-stroke, the front relief valve could remain closed thereby routing the fluid into the front volume 240 and preventing fluid from escaping to atmosphere. A back relief valve could perform a similar function during the in-stroke. The valves may be set to open at substantially equal pressures or be varied to respond at substantially different pressures.

While the foregoing is directed to the preferred embodiment of the present invention, other and further embodiments of the invention may be devised without departing from the basic scope thereof, and the scope thereof is determined by the claims which follow.

What is claimed is:

1. A semiconductor processing system comprising:
   a) a transfer chamber having an aperture formed therein to provide access to a semiconductor processing chamber disposed adjacent the transfer chamber;
   b) a door adapted to substantially cover the aperture; and
   c) a staged variable speed pneumatic cylinder coupled to the door, wherein the pneumatic cylinder comprises:
      i) a front primary channel at a front end of the pneumatic cylinder and a back primary channel at a back end of the pneumatic cylinder;
      ii) a front auxiliary channel at the front end having a smaller cross sectional area than that of the front primary channel and a back auxiliary channel at the back end of the pneumatic cylinder having a cross sectional area smaller than that of the back primary channel;
      iii) a front bridging conduit connecting the front primary channel to the front auxiliary channel and a back bridging conduit connecting the back primary channel to the back auxiliary channel;
      iv) a front recess fluidly connected to the front primary channel and a back recess fluidly connected to the back primary channel; and
      v) a front sealing element attached on a front piston face and adapted to be received by the front recess and a back sealing element attached on a back piston face and adapted to be received by the back recess.

2. The system of claim 1 further comprising a bumper disposed on the back piston face and positioned to engage a back end cap in the pneumatic cylinder's retracted position whereby the back piston face and the back end cap are prevented from contacting.

3. The system of claim 1 further comprising a pressure relief valve disposed in one or both of the auxiliary channels.

4. The system of claim 1 further comprising a compressed fluid source coupled to the front primary channel and the back primary channel.

5. The system of claim 4 wherein the compressed fluid is air.

6. A slit valve door apparatus for a processing system, comprising:
   a) at least one slit valve surface having an aperture adapted to provide access to the processing system;
   b) a retractable door adapted to substantially cover the aperture; and
   c) a staged variable speed pneumatic cylinder coupled to the door, the pneumatic cylinder comprising:
      i) a cylinder body defining a cylinder bore enclosed at each end by a front end cap and a back end cap;
      ii) a longitudinally reciprocating piston disposed in the cylinder bore defining a front volume and a back volume, the piston having a front piston face and back piston face;
      iii) a piston rod secured to the piston at a back end and secured to the door at a front end;
      iv) a front sealing element secured to the front piston face;
      v) a back sealing element secured to the back piston face;
      vi) a front primary channel and a front auxiliary channel connected by a front bridging conduit;
      vii) a back primary channel and a back auxiliary channel connected by a back bridging conduit;
      viii) a front recess fluidly connecting the front primary channel to the front volume, the front recess having a shape conformed to sealingly receive the front sealing element during the end of an out-stroke of the pneumatic cylinder, whereby the front primary channel becomes substantially sealed from the front volume and fluid is biased to escape from the front volume through the front auxiliary channel during the pneumatic cylinder's continuing stroke; and
      vii) a back recess fluidly connecting the back primary channel to the back volume, the back recess having a shape conformed to sealingly receive the back sealing element at the end of an in-stroke of the pneumatic cylinder, whereby the back primary channel becomes substantially sealed from the back volume and fluid is biased to escape from the back volume through the back auxiliary channel during the pneumatic cylinder's continuing stroke.

7. The apparatus of claim 6 further comprising a compressed fluid source coupled to the front primary channel and the back primary channel.

8. The apparatus of claim 6 further comprising a bumper disposed in the back piston face and positioned to engage the back end cap in the pneumatic cylinder's retracted position whereby the back piston face and the back end cap are prevented from contacting.

9. The apparatus of claim 6 further comprising a pressure relief valve disposed in at least one of the auxiliary channels.

10. A semiconductor processing system comprising:
   a) a first vacuum chamber having an aperture formed therein to provide access to a second vacuum chamber disposed adjacent the first vacuum chamber;
   b) a door adapted to substantially cover the aperture; and
   c) a staged variable speed pneumatic cylinder coupled to the door and adapted to reduce a speed of the door during a terminal portion of travel prior to covering the aperture, wherein the pneumatic cylinder comprises:
      i) a front primary channel at a front end of the pneumatic cylinder and a back primary channel at a back end of the pneumatic cylinder;
      ii) a front auxiliary channel at the front end having a smaller cross sectional area than that of the front primary channel and a back auxiliary channel at the back end of the pneumatic cylinder having a cross sectional area smaller than that of the back primary channel;
      iii) a front bridging conduit connecting the front primary channel to the front auxiliary channel and a back bridging conduit connecting the back primary channel to the back auxiliary channel;
      iv) a front recess fluidly connected to the front primary channel and a back recess fluidly connected to the back primary channel; and
      v) a front sealing element attached on a front piston face and adapted to be received by the front recess and a back sealing element attached on a back piston face and adapted to be received by the back recess.

11. The system of claim 10 further comprising a bumper disposed on the back piston face and positioned to engage a back end cap in the pneumatic cylinder's retracted position whereby the back piston face and the back end cap are prevented from contacting.

12. The system of claim 10 further comprising a pressure relief valve disposed in one or both of the auxiliary channels.

13. The system of claim 10 further comprising a compressed fluid source coupled to the front primary channel and the back primary channel.

14. The system of claim 13 wherein the compressed fluid is air.

* * * * *